(12) United States Patent
Wilson et al.

(10) Patent No.: US 7,987,107 B2
(45) Date of Patent: Jul. 26, 2011

(54) SYSTEMS AND METHODS FOR END-TO-END FULFILLMENT AND SUPPLY CHAIN MANAGEMENT

(75) Inventors: Arnaud J. Wilson, Alpharetta, GA (US);
Jay Bowers, Saint Augustine, FL (US);
Harvey Rickles, Dunwoody, GA (US);
Ken Giordano, Cumming, GA (US);
Kevin McPherson, Cumming, GA (US);
Will Fastie, Baltimore, MD (US);
Cynthia L. Johnson, Duluth, GA (US);
Tim Zach, Dunwoody, GA (US)

(73) Assignee: United Parcel Service of America, Inc.

( * ) Notice: Subject to any disclaimer, the term of this patent is extended or adjusted under 35 U.S.C. 154(b) by 2168 days.

(21) Appl. No.: 09/896,559

(22) Filed: Jun. 29, 2001

(65) Prior Publication Data
US 2002/0133387 A1 Sep. 19, 2002

Related U.S. Application Data

(60) Provisional application No. 60/214,910, filed on Jun. 29, 2000.

(51) Int. Cl.
*C06Q 10/00* (2006.01)
(52) U.S. Cl. ...................... 705/7.12; 705/7.13
(58) Field of Classification Search .............. 705/1, 8, 705/22, 26, 7, 28, 29, 9, 10, 11, 1.1, 7.12, 705/7.13
See application file for complete search history.

(56) References Cited

U.S. PATENT DOCUMENTS

| 5,918,220 A | 6/1999 | Sansone et al. |
| 5,991,739 A | 11/1999 | Cupps et al. |
| 6,058,373 A * | 5/2000 | Blinn et al. ............... 705/26 |
| 2001/0042024 A1* | 11/2001 | Rogers .................... 705/26 |
| 2002/0038261 A1* | 3/2002 | Kargman et al. ............. 705/26 |
| 2002/0062310 A1* | 5/2002 | Marmor et al. ............... 707/3 |

(Continued)

FOREIGN PATENT DOCUMENTS
JP 05-197735 8/1993
(Continued)

OTHER PUBLICATIONS

"Xerox Moves for the Internet, . . . Solutions", Telecomworldwide, pN/A, Oct. 26, 1995, Dialog File 636, 028 95 797.*

(Continued)

*Primary Examiner* — Dean T Nguyen
(74) *Attorney, Agent, or Firm* — Alston & Bird LLP (57) ABSTRACT

A supply chain management system facilitates the efficient allocation and shipment of items. At least one customer having a geographical location associated therewith communicates with at least one client. The at least one client generates an order on behalf of the customer, where the order includes item data corresponding to at least one item and location data corresponding to the customer geographical location. A promising engine is in communication with the at least one client and with a plurality of warehouses in the system. The promising engine identifies a shipping warehouse from the plurality of warehouses based in part upon the location data corresponding to the customer geographical location, where the shipping warehouse is the nearest warehouse to the customer geographical location that has an ability to ship the at least one item to the at least one customer within a specified timeframe.

9 Claims, 7 Drawing Sheets

U.S. PATENT DOCUMENTS

2002/0082954 A1*  6/2002  Dunston .................. 705/28
2002/0138358 A1   9/2002  Scheer

FOREIGN PATENT DOCUMENTS

JP        06-028369       2/1994

OTHER PUBLICATIONS

Moeller, M. "FedEx . . . Efficiency", PC Week, v13, n26, p100(1), Jul. 1, 1996, Dialog file 148: 088 02 422.*

"Computer reseller making money on Net", PC Week, pN03, Nov. 4, 1996, File 16:04664406.*

Sachdev, A. "Clearwater . . . Online Middleman", KRTBN Knight-Ridder Tribune Business News, Mar. 16, 2000.*

"www.invacare.com", Business Wire, Nov. 3, 1999. Dialog File 20:08056653.*

Official Action from Canadian Patent Office for Canadian Application No. 2,414,720, dated May 27, 2005.

* cited by examiner

SYSTEMS AND METHODS FOR END-TO-END FULFILLMENT AND SUPPLY CHAIN MANAGEMENT

RELATED APPLICATION DATA

The present application claims priority from U.S. Provisional Patent Application No. 60/214,910, titled "METHODS, SYSTEMS AND COMPUTER PROGRAM PRODUCTS FOR REAL-TIME SUPPLY CHAIN MANAGEMENT", filed on Jun. 29, 2000, the entire contents of which are incorporated by reference herein.

FIELD OF THE INVENTION

The present invention relates generally to supply chain management systems, and more particularly, to order fulfillment and supply chain management systems that efficiently allocate and distribute items to customers in a cost-effective manner.

BACKGROUND OF THE INVENTION

It has long been acknowledged that efficient distribution systems are essential to companies operating in environments where transactions occur between remote parties. An early and yet still common example of such a remote transaction is that which occurs between customers and department stores via the placement of a telephone catalog order. The convenience and seamless operation of such a retail system relies not only on the consumer's ability to place the order, but on the retailer's ability to place the goods in the hands of the consumer. Distribution systems have performed this function for many decades, albeit with various levels of success. For instance, larger, old economy companies may operate their own distribution systems which are effective in handling bulk orders but not geared to less frequent, smaller shipments. On the other end of the spectrum, smaller companies with fewer orders, such as Internet retailers (or e-retailers), may depend on third party distribution systems because they do not have expertise in distribution. Nevertheless, regardless of the size of the company, or the quantity of goods ordered and shipped to a consumer, one common denominator in implementing an efficient and profitable remote transaction business is the effectiveness of getting orders from a warehouse to the consumer.

Over the past five years the Internet has caused a meteoric rise in remote transactions. Today, given an Internet connection consumers can order virtually any product or service from anywhere around the world. Because the Internet offers retailers the ability to create an electronic store from which to advertise goods, the barriers for entry are minimal, resulting in an enormous Internet presence for small and medium-sized companies. The advantage of an Internet presence for the small or medium sized company is that the company is accessible by vast amounts of consumers and is just as easily accessible to consumers as a conventional brick and mortar store selling goods through an Internet presence. The Internet thus provides companies of every size the means of presenting and selling products to users. However, any company, large or small, must establish a means to ship their products to the online consumer. Although placing a product in the hands of consumers is a problem for both conventional walk-in stores and e-retailers, and the logistical issues associated with the movement of goods from warehouses to consumers exist in virtually any environment in which goods are shipped from a remote location to a customer, logistics problems are particularly pervasive in the e-commerce realm due to e-retailers' lack of experience with the Internet business model and the high volume of consumers that purchase items online.

To remain competitive, small and medium size companies must make deliveries on time and in an efficient manner while minimizing costs. Currently, this logistical hurdle is one of the greatest barriers to the success of a small or medium size company. In the realm of Internet e-retailers, deliveries often aren't made on a timely scale, due to the fact that a companies' shipping infrastructure is unable to ship items that customers have ordered via an Internet web site. A number of entities have begun to provide shipping and other back-end services (e.g., credit card processing) to e-retailers so that the e-retailers can focus on the front end of their systems. By outsourcing distribution, companies are relieved of overhead costs associated with in-house distribution, such as staffing, warehouse facility maintenance, and distribution costs.

There are many third-party logistics providers that provide retailers with third party distribution solutions. The majority of these provide shipping from one warehouse that the third-party logistics provider has established for such purpose. The third-party logistics provider then ships the e-retailers' products to consumers from this warehouse via a carrier associated with the third-part logistics provider. The warehouse distribution provider incorporates its own efficiency standards to reduce handling time of items, minimize costs associated with shipping an item, reduce the likelihood that items will be lost or stolen, and similar warehouse logistics concerns. However, the warehouse often has minimum control over the costs associated with shipping the item via the carrier.

What is needed is a system that provides companies with warehousing and order-fulfillment. More specifically, end-to-end supply chain management services for the quick and cost-effective launch of e-businesses is desirable. Such a system would be beneficial to not only small to midsize Internet start-ups, but also to old-school bricks-and-mortar businesses getting serious about Internet distribution. It would be advantageous if such a system could ship products to 90 percent of the country in two days, from one of a plurality of warehouses located near the consumer, thus reducing carrier costs. The system would select the shipping warehouse based upon the location of the consumer and the ability of the warehouse to fulfill the order.

SUMMARY OF THE INVENTION

The system of the present invention reserves available inventory for clients, including manufacturers, wholesalers, retailers, or distributors, with whom customers placed inquiries and/or orders for items. A client may receive customer inquiries in a variety of ways, such as through a web page established by the client, by a standard EDI format transmitted over a dedicated network or the like, or by some other medium pre-arranged by the client with its customer. Once the client has interacted with its customer to determine the customer's wants, the client sends either a request for promise or request for order to a promising engine to determine whether the item requested by the customer is in inventory and can be delivered to the desired location by the desired date. The promising engine is responsible for receiving and responding to customer requests, reserving available inventory for clients, and for directing one or more distribution centers (referred to herein as warehouses) to fulfill orders received from clients. According to one aspect of the invention, the promising engine identifies a shipping warehouse from the plurality of warehouses based in part upon the location data corresponding to the customer geographical location, wherein the shipping warehouse is the nearest warehouse to the customer geographical location that has an ability to ship the at least one item to the at least one customer within a specified timeframe. Thus, the system enables the reservation of items and/or shipment of such items from one or more warehouses best suited to ship the items to the customers.

According to one embodiment of the invention, there is disclosed a supply chain management system that facilitates the efficient allocation and shipment of goods (also referred to herein as items). The supply chain management system includes at least one customer, wherein the at least one customer has a customer geographical location associated therewith, and at least one client, wherein the at least one client is associated with the at least one customer, and wherein the at least one client generates an order including item data corresponding to at least one item and location data corresponding to the customer geographical location. The system further includes a plurality of warehouses, wherein at least one warehouse of the plurality of warehouses is located separately from at least one other warehouse of the plurality of warehouses, and wherein each of the plurality of warehouses is located at a respective geographical distance from the customer geographical location. A promising engine is also included in the system, in communication with the at least one client and the plurality of warehouses, and the promising engine identifies a shipping warehouse from the plurality of warehouses based in part upon the location data corresponding to the customer geographical location. Moreover, in the supply chain management system, the shipping warehouse is the nearest warehouse to the customer geographical location that has an ability to ship the at least one item to the at least one customer within a specified timeframe.

According to one aspect of the present invention, the promising engine selects a shipping warehouse from the plurality of warehouses based exclusively upon the nearest warehouse to the customer geographical location that has an ability to ship the at least one item to the at least one customer within a specified timeframe, and wherein the nearest warehouse to the customer geographical location is identified based in part on the location data. According to another aspect of the invention, the specified timeframe is established by the at least one customer. According to yet another aspect of the invention, the shipping warehouse is the nearest warehouse to the customer geographical location that has the at least one item in inventory. The location data may be selected from a zip code, country, region, or city and state. Typically, one or more carriers are associated with the promising engine for shipping the at least one item to the at least one customer. According to yet another aspect of the present invention, the at least one client supplies at least one of the plurality of warehouses with the at least one item. Additionally, the client may be is in communication with the promising engine via a wide area network.

According to another embodiment of the invention, there is disclosed a method for facilitating the efficient allocation and shipment of goods. The method includes generating at least one order, wherein the at least one order includes item data corresponding to at least one item and location data corresponding to a customer geographical location, reviewing the at least one order to identify a shipping warehouse from a plurality of warehouses based in part upon the location data corresponding to the customer geographical location, and determining whether the shipping warehouse has sufficient inventory to ship the at least one item to the consumer.

According to one aspect of the invention the method further includes instructing the shipping warehouse to ship the at least one item to the customer. The shipping warehouse may be the nearest warehouse to the customer's geographical location that has an ability to ship the at least one item to the at least one customer within a specified timeframe. Alternatively, the shipping warehouse may be selected based upon a relationship with the nearest warehouse to the customer's geographical location, where the shipping warehouse has an ability to ship the at least one item to the at least one customer within a specified timeframe.

According to another aspect of the invention, the method may include the step of transmitting the at least one order from a client to a promising engine, where the promising engine reviews the at least one order. The transmission of the at least one order from the client to the promising engine may also occur via the Internet. According to yet another aspect of the invention the item data can include customer shipment terms, such as a delivery date or a desired type of delivery. After a customer has submitted at least one order, the method may include responding to the customer to notify the customer that the at least one item will be shipped to the customer. Finally, the shipping warehouse may operate in a first-in first out manner such that the shipping warehouse ships items in the order that instructions to ship items are received.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
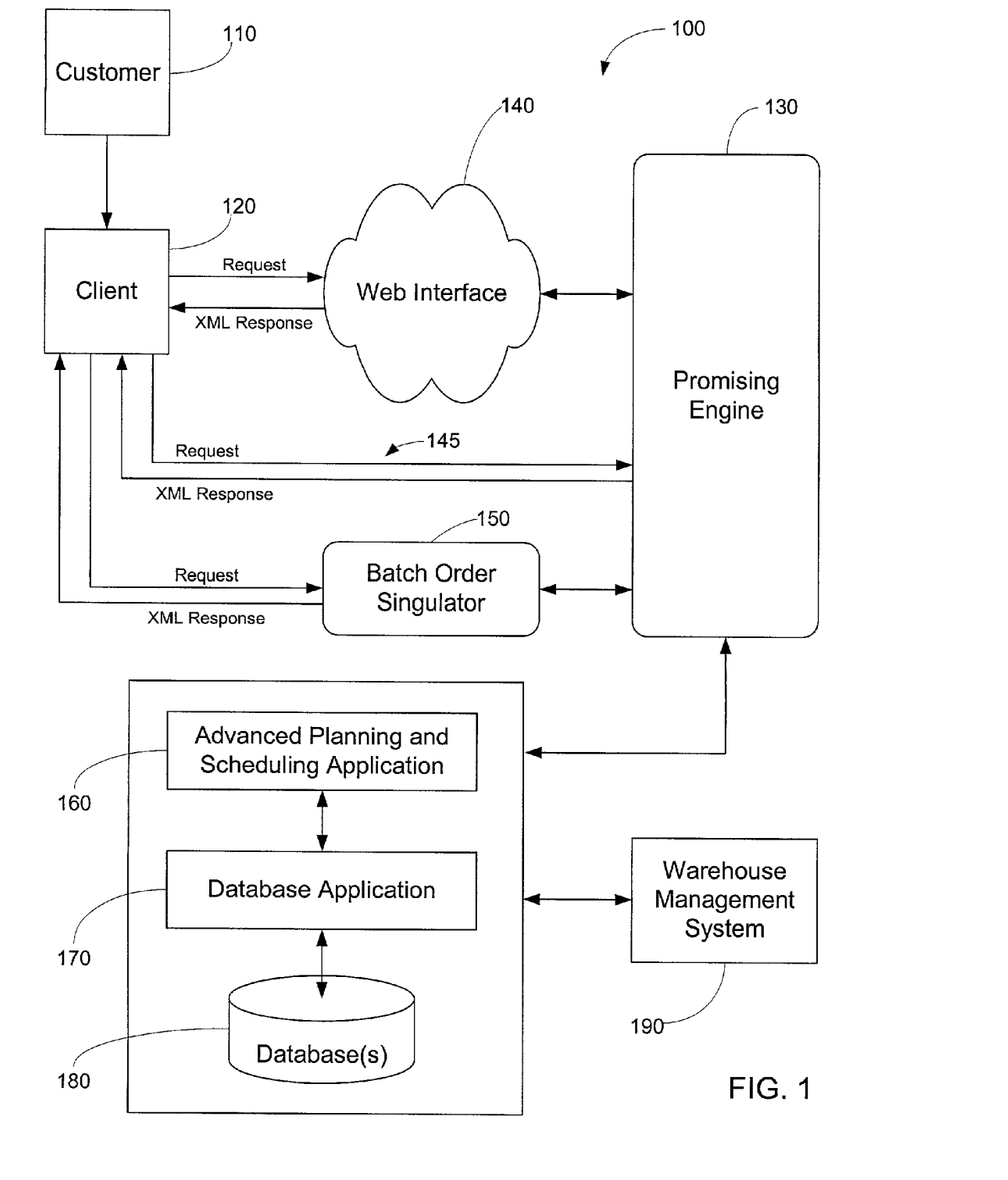
FIG. 1 shows a block diagram of a system of the present invention, according to one embodiment of the present invention.

Referring now to FIG. 1, the supply chain management system 100 of the present invention facilitates the reception of inquiries and orders (collectively, also referred to herein as requests) from customers 110 for items to be shipped to the customers 110 by a carrier (not illustrated) associated with a promising engine 130. Customers interact with clients 120 to place the orders or inquiries for items, and the clients 120, in turn, forward requests representing the customer inquiries and/or orders to the promising engine 120 on the customer's behalf. The promising engine 130 is responsible for receiving and responding to customer requests, including reserving available inventory for clients, and for directing one or more warehouses to fulfill orders received from clients 120. Thus, the system 100 enables the reservation of items and/or shipment of such items from one or more warehouses best suited to ship the items to the customers 110.

A client 120 may receive customer inquiries in a variety of ways, such as through a web page established by the client, by a standard EDI format transmitted over a dedicated network or the like, or by some other medium pre-arranged by the client with its customer. Once the client 120 has interacted with its customer 110 to determine the customer's wants, the client 120 sends either a request for promise or request for order to the promising engine 130 to determine whether the item requested by the customer is in inventory and can be delivered to the desired location by the desired date. Requests for promises and requests for orders are discussed in detail below. As illustrated in FIG. 1, the client 120 is in communication with the promising engine 130 via a web interface 140, directly, and/or via a batch order singulator 150.

The web interface 140 preferably includes at least one client web page through which the customer 110 or client 120 can request that items be shipped to the customer 110 or can request that the promising engine 130 reserve or allocate items for a temporary time period, as will be discussed in greater detail below. For instance, in the Internet retailer environment, the web interface 140 may include an Internet web page established by an Internet retailer through which a retail customer requests shipment of one or more purchased items. As will be appreciated by those of ordinary skill in the art, web interface 140 may also include a server for establishing and enabling communication with the at least one client web page. Although it is preferable that the web interface 140 receive communications from the client in extensible markup language (XML) format, the web interface 140 may receive inquiries and orders from the client 120 in any format suitable for forwarding the requisite data identifying the inquiries and orders. Nevertheless, XML is used in the preferred embodiment of the system 100 because XML is particularly useful in transmitting unstructured data records, which is the preferred format of the data records in system 100. It should be noted that, according to one aspect of the invention, data is both received and transmitted in XML format by the promising engine 110, so that responses from the promising engine 110 are in XML format. The data format may forward data to the web interface 140 in the form of complex data records, including data identifying a plurality of inquiries and/or orders, as well as information such as a customer's identity, ship-to information, requested delivery dates, and the like. This data may be associated with one or more orders, where each order is within one or multiple lines, such as in a data record.

The client requests can include requests received through the web interface 140 in real time or via a batch 150 transfer. Additionally, the requests may be received in a variety of formats, including in electronic data interchange (EDI) format having comma-delimited values. Once the web interface 140 receives the requests, the interface 140 converts the requests into XML documents (irrespective of the format in which the orders are received). The conversion of the requests into an XML document or XML-formatted request is well known to those of ordinary skill in the art, and as such, is not discussed in detail herein. Because of this conversion, the promising engine 110 receives only XML-formatted requests regardless of the request format provided by the client 120.

As illustrated in FIG. 1, the client 120 may also be in communication with the promising engine 130 via direct link 145 or via a batch order singulator 150. Where the client is in communication with the promising engine 130 via a direct link 145, the client 120 may be communicating with the promising engine 130 via a wide area network (WAN), local area network (LAN), dedicated line, conventional dial-up connection, or similar methods that are well known to those of ordinary skill in the art. According to one aspect of the present invention, it is preferable that the direct communication from the client to the promising engine 130 be in XML format, which is a convenient format for transmitting complex data records. Likewise, it is preferred that communications from the promising engine 130 to the client 120 via the direct link 145 are also in XML format (illustrated as an XML response in FIG. 1). This eliminates the requirement that the client and/or promising engine include conversion software which is not otherwise required to communicate via the web interface 140 or batch order singulator 150. It will be appreciated, however, that other formats well known to those of skill in the art may be utilized to transmit data over the direct link 145.

The data transmitted to the promising engine 130 via the direct link 145 is similar in content to the data transmitted to the promising engine 130 via the web interface 140 in the embodiment described previously. However, unlike communications passed from the web interface 140 to the promising engine 130, which are in secure hyper transfer text protocol, communications over the direct link 145 are in the form of file transfer protocol (FTP), as is well known to those of skill in the art. Using a direct link 145 between the client and promising engine 130 does not require dependency on Internet communications, which require an Internet Service Provider (ISP) and may be less reliable than direct communications. Therefore, the direct link 145 may be desirable where an Internet, WAN, etc., connection is unavailable. However, the direct link 145 may not provide a convenient graphical user interface or always-on connectivity. Furthermore, where the promising engine 130 requires the communication to be in a specified format, such as XML, the client 120 or promising engine 130 must convert any such communications to the XML format, a function which may also be provided by the web interface 140 in the previous embodiment.

A third method by which the client 120 may communicate with the promising engine 130 (and visa versa) is via the batch order singulator 150, which may be located in a communication path between the client 120 and the promising engine 130. Therefore, the batch order singulator 150 may be located on a LAN, WAN, or the like, and may be located on either or both of the client 120 and promising engine 130. The purpose of the batch order singulator 150 is to identify and/or separate requests received in batch form from a client submitting multiple items for shipment concurrently to the promising engine 130. Therefore, where a client 120 submits a plurality of requests to the promising engine 130, it is preferred that the requests are transmitted to the promising engine 130 via the batch order singulator. The batch order singulator 150 may also forward responses from the promising engine to the client 120 without alteration, or may collect multiple XML responses received from the promising engine 130 and combine the responses into one communication that is forwarded to the client 120. It will be appreciated by those of ordinary skill in the art that the function of the batch order singulator 150 may be performed by either the client 120 or promising engine 130. Additionally, the web interface 140 may perform a similar function as the batch order singulator for requests transmitted to the promising engine 130 over the Internet. Moreover, communications, such as requests, transmitted from a client 120 to the promising engine 130 via the batch order singulator, may result in responses transmitted from the promising engine 130 to the client 120 via one of the other methods described above, such as via the direct link 145 or via the web interface 140.

As noted above, the promising engine 130 is responsible for receiving and responding to customer requests, including reserving available inventory for clients, and for directing one or more warehouses to fulfill the requests received from clients 120. More specifically, the promising engine 130 receives requests for promise and requests for order and determines whether the item requested by the customer is in inventory and can be delivered to the desired location by the desired date. A request for promise seeks a promise from the promising engine 130 that an item is available and can be shipped to a customer, meeting customer and/or client shipment terms. A request for promise does not bind the client. The promising engine 130 reserves the item for a reserve time period; however, the promising engine does not direct a shipping warehouse to ship the item to the customer. After the reserve time period has lapsed, the promising engine 130 notifies the shipping warehouse that the item should no longer be earmarked as reserved.

A request for order is similar to a request for promise, but is a request that the promising engine 130 fulfill the order if possible. A response by the promising engine 130 that a requested order can be fulfilled binds the promising engine 130 to supply the order, unless the customer or client changes the request prior to the start of the shipment of items identified by the order. Therefore, if the promising engine 130 can meet customer and/or client shipment terms, the promising engine 130 directs a shipping warehouse to fulfill the request for order.

A request for promise and a request for order are of the same general format and contain the same data except that the request for order may contain an identifier to match the request for order with a previously provided promise so that a request for order following a request for promise does not necessitate the resubmission of data where the shipment terms and items are identical in the request for order as in the previously transmitted request for promise. The promising engine 130 may identify the nature of the request (promise or order) through data identifying the type of request, such as a flag associated with each request. The details of a request include item, item quantity, customer location data, shipping options, delivery date, customer postal zip code, address, client unique ID code, and like items typically associated with an order. A request may include multiple line items, each line item having a delivery date and ship-to location associated therewith. Geographical location input by the customer is required because it is used by the system, more specifically, the promising engine 130, to determine the warehouse from which the requested item will be shipped if ordered.

In addition to item data corresponding to the item and location data, the request can include item data identifying a desired Value Added Services (VAS). An example of a VAS item is gift wrapping paper, which would need to be sent to the promising engine 130 with the actual items requested. Where this data is recognized by the promising engine, the promising engine 130 will check warehouse inventory and capacity for the gift wrapping paper along with the actual item. It should be appreciated that there may be multiple items in the order, of which only a subset may require gift wrapping. In this case, only those items to be gift wrapped would be included in a shipment set (i.e., group of products to be shipped) with the gift wrapping paper such that the promising engine 130 requires both criteria to be met prior to selecting a warehouse to fulfill the request. There may also be VAS items, such as inserts and catalogs, that will be included in the order, but will not have inventory or capacity checks associated. Not having enough supply or capacity to include these type of services would not prevent an order from shipping. They need to be on the order so that they will be included once the order reaches execution (the warehouse).

Referring again to the system 100 of FIG. 1, the promising engine 130 is implemented in combination with an advanced planning and scheduling (APS) application 160, which provides inventory and order management, accounts receivable tracking, and advanced planning and scheduling in the order fulfillment system 100. Although the promising engine 130 could incorporate the features of the APS application 160, and thus may be implemented without a separate APS application 160, a preferred embodiment of the present invention leverages the use of a conventional APS application 160. According to one aspect of the invention, the APS application 160 comprises an Oracle IIi™ APS application that provides a number of functions necessary to the system 100. These functions include global available to promise (ATP) and advanced supply chain planning, which are functions well known in the art. Additional functions may be supported by the APS application 160, such as demand planning and manufacturing scheduling, but are not crucial to the preferred embodiment of the present invention.

The global ATP (GATP) component of the APS application 160, which may include a GATP application or server, manages database calls to interpret the status of the system inventory at a particular time, thus maintaining a snapshot of all inventory available to promise by the system 100 at a particular instant. Therefore, the promising engine 130 queries the GAPS to determine the status of warehouse inventory. Updates to data, such as supply inventory, are provided to the APS application 160 by the database application 170, which is preferably another conventional off-the-shelf component, such as an Oracle 8I™ database application. One or more core modules may also be used, such as inventory and order management applications. The database application 170 updates the GATP inventory from one or more databases 180 located at the warehouse level. Each warehouse includes a warehouse management system 190 that enables the reception, fulfillment and acknowledgement of orders, and the update of one or more databases 190 associated with the warehouse. Using the capabilities of the database application 170, the GATP function (or application) of the APS application maintains a picture of open (i.e., unfulfilled) orders and closed (i.e., shipped) orders through shipping confirmation provided by the warehouse management system 190. In sum, the APS application 160 simply acts as a repository for supply and demand information.

Figure 3:
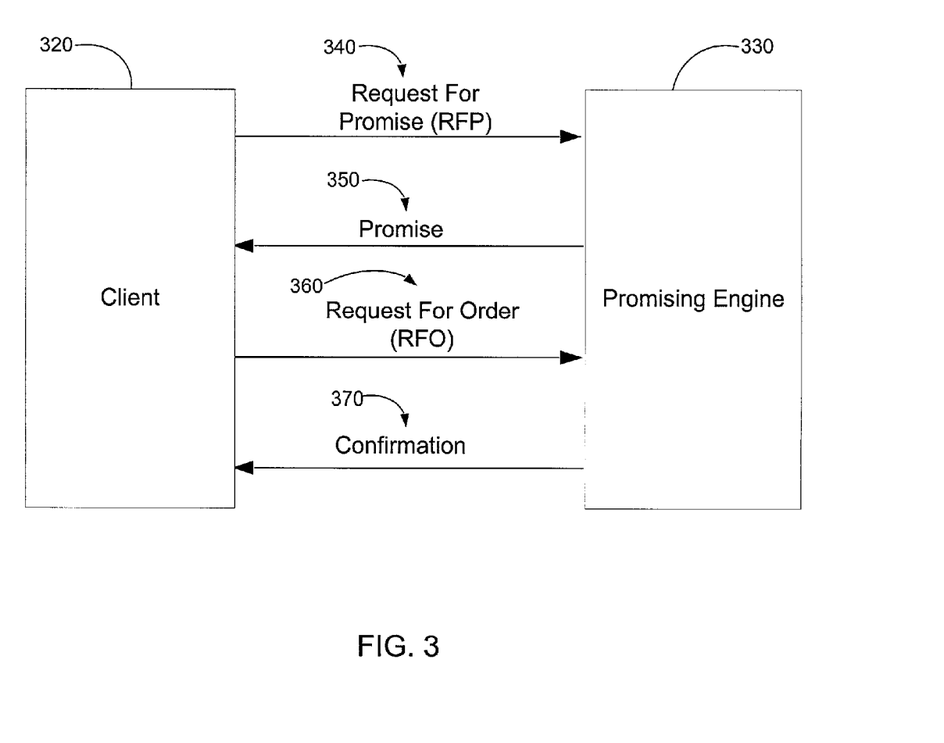
FIG. 3 shows a communication process flow between a client and a promising engine, according to one aspect of the present invention.

Thus, the promising engine 130 is the intelligent part of the system 100, and queries GATP to determine whether the system 100 has particular items for shipment on a particular date from a particular warehouse. The order with which the promising engine 130 queries the inventory of each warehouse is described in detail below, and is dependent upon the geographical location of the customer. After GATP sends an answer back to the promising engine 130, the promising engine 130 examines the answer to make a determination as to whether an order can be fulfilled by a warehouse. If not, the promising engine determines if another warehouse can fulfill the request. Thereafter, the promising engine 130 responds to the customer request in an XML response, as illustrated in FIG. 3. If the order can be fulfilled by a warehouse, and the request is a request for order, the promising engine 130, via the APS application 160, forwards instructions to the warehouse management system 190 to ship the ordered item.

Figure 2:
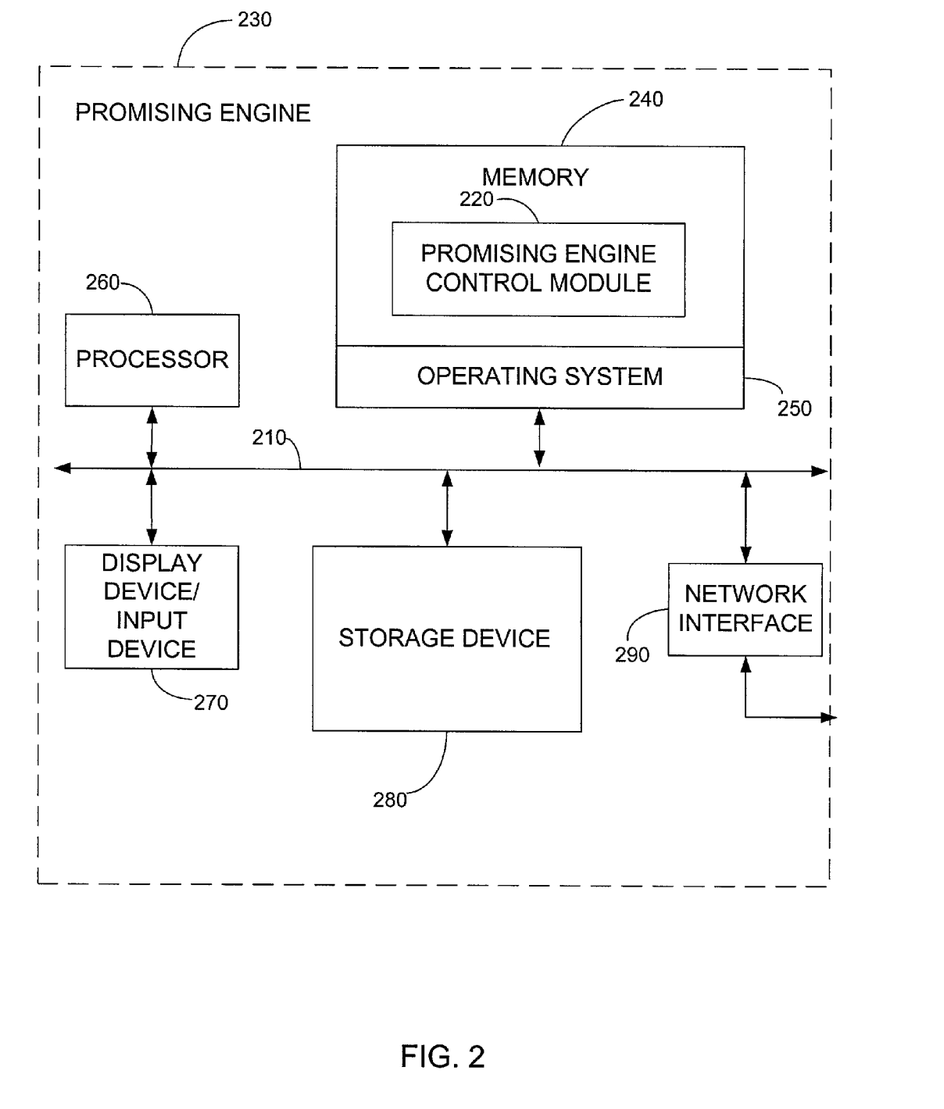
FIG. 2 shows a block diagram of a promising engine according to one embodiment of the present invention.

FIG. 2 shows a block diagram of the promising engine 230 described in the system of FIG. 1, according to one embodiment of the present invention. The promising engine 230 comprises a processor 260, storage device 280, memory 240, input and output devices 270, and network interface 290. Each of the elements within the promising engine processor 260 communicate with each other via a bus 210. Furthermore, the network interface 290 enables the promising engine 230 to interface and communicate with other elements of a computer network, such as via a WAN, LAN, PSTN, packet switched network, the Internet, or the like, using known hardware.

The memory 240 includes an operating system 250 includes an operating system 250 and a promising engine control module 220. The promising control module 220 comprises software for controlling the operation of the promising engine, as will be described in detail below with reference to FIGS. 3-5. The promising engine control module 220 operates with the assistance of the operating system 250 and processor 260. The operating system may be any well-known operating system, such as Windows NT™, which executes the instructions of the promising engine control module 220 and facilitates communication of the promising engine control module 220 with other promising engine 230 elements or those network elements external to and in communication with the promising engine 230 via the network interface 290.

The storage device 280 represents at least one storage device, such as a hard disk drive, a floppy disk drive, a CD-ROM drive, or optical disk drive, for storing information on various computer-readable media, such as a hard disk, a removable magnetic disk, CD-ROM, or the like. The storage device 280 and its associated computer-readable media provides nonvolatile storage for the promising engine. It is important to note that the computer-readable media could be replaced by any other type of computer-readable media known in the art. Such media may include, for example, magnetic cassettes, flash memory cards, digital video disks, and Bernoulli cartridges.

It will be appreciated by one of ordinary skill in the art that one or more of the promising engine 230 components may be located geographically remotely from other promising engine 230 components. Furthermore, one or more of the components may be combined, and additional components performing functions described herein may be included in the promising engine 230.

Referring now to FIG. 3, the process of promising a item for a particular delivery date begins when a client 320 sends a request for promise (RFP) 340 to the promising engine 330. The request for promise 340 contains the needed information for evaluating the availability of the requested items. For instance, the request includes item data corresponding to one or more requested items, location data corresponding to the customer's geographical location, shipping terms, and additional data required to process the request. If the items are available to be supplied to the client's customer within the desired timeframe considering shipping options, then the promising engine 330 returns a promise 350 to the client 320. This promise 350 is a temporary reservation of the items. If the client wants to lock-in (commit) to the terms of the request and associated promise, then the client will send a request for order (RFO) 360 to the promising engine 330. A request for order 360 is a request that the client is willing to be committed on the terms of the request. This request for order 360 will also have an identifier to allow the promising engine to marry up the request for order 360 and previously provided promise 350. This identifier will allow the promising engine 330 to identify the items requested by the client in a previously provided request for promise without requiring that such information be retransmitted to the promising engine 330. After matching the request 360 with the promise 350, the promising engine 330 sends a confirmation 370 to the client to complete the transaction and bind both the client and the promising engine 330 to the terms of the request for order 360. If a request for order is not sent, the promise will expire and the promising engine 330 will not be bound.

Figure 4:
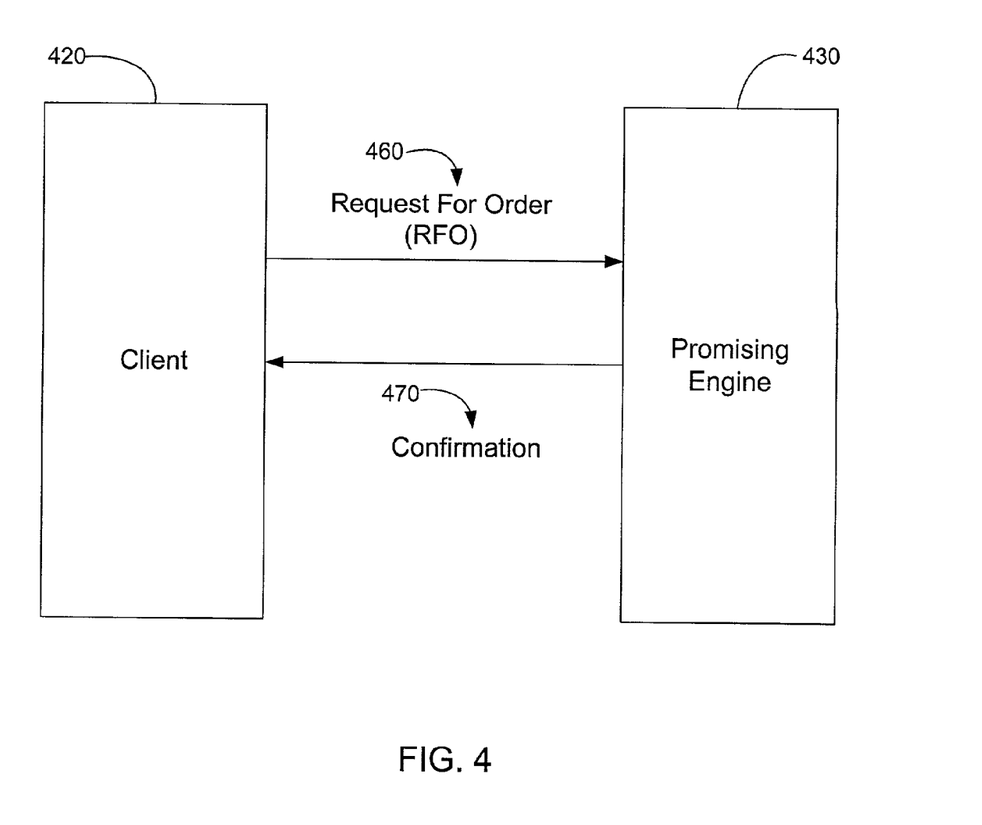
FIG. 4 shows a communication process flow between a client and a promising engine, according to another aspect of the present invention.

As illustrated by FIG. 4, a client 400 may send a request for order 460 to the promising engine 430 without having previously submitted a request for promise. By so doing, the client 420 is committing to the terms of the request for order 460 if accepted by the promising engine 430. Of course, there is no previous promise to match up so the promising engine 430 begins by determining the availability of the items. If the items are available as requested in the request for order 460, then the promising engine 430 may send a confirmation 470 to the client 420 that can bind both the client and the promising engine 430 complying with the terms of the request for order 420 i.e. an order is formed.

The flow illustrated in FIG. 4 is similar to the processing of a request for order if an associated previously provided promise, shown in FIG. 3, has expired. In this scenario, the request for order 460 will be processed as if no previous request for promise was sent. If the items are available, then the order will be formed and a confirmation 470 will be sent back to the client. Additionally, if a request for order is sent to the promising engine 430 with an identifier of a previously provided promise but has differing terms than the original request for promise, then the promising engine 430 will determine availability in accordance with FIG. 4 as if no previous promise existed. Nonetheless, the identifier can still be used by the promising engine 430 to identify the transaction without requiring a newly transmitted identification of the transaction to the promising engine 430 with the request for order. Thus, the process flow illustrated in FIG. 4 can differ from the flow in the last two steps of FIG. 3 because in the flow of FIG. 3 an identifier is included in a request for order corresponding to a promise that has lapsed.

Figure 5A:
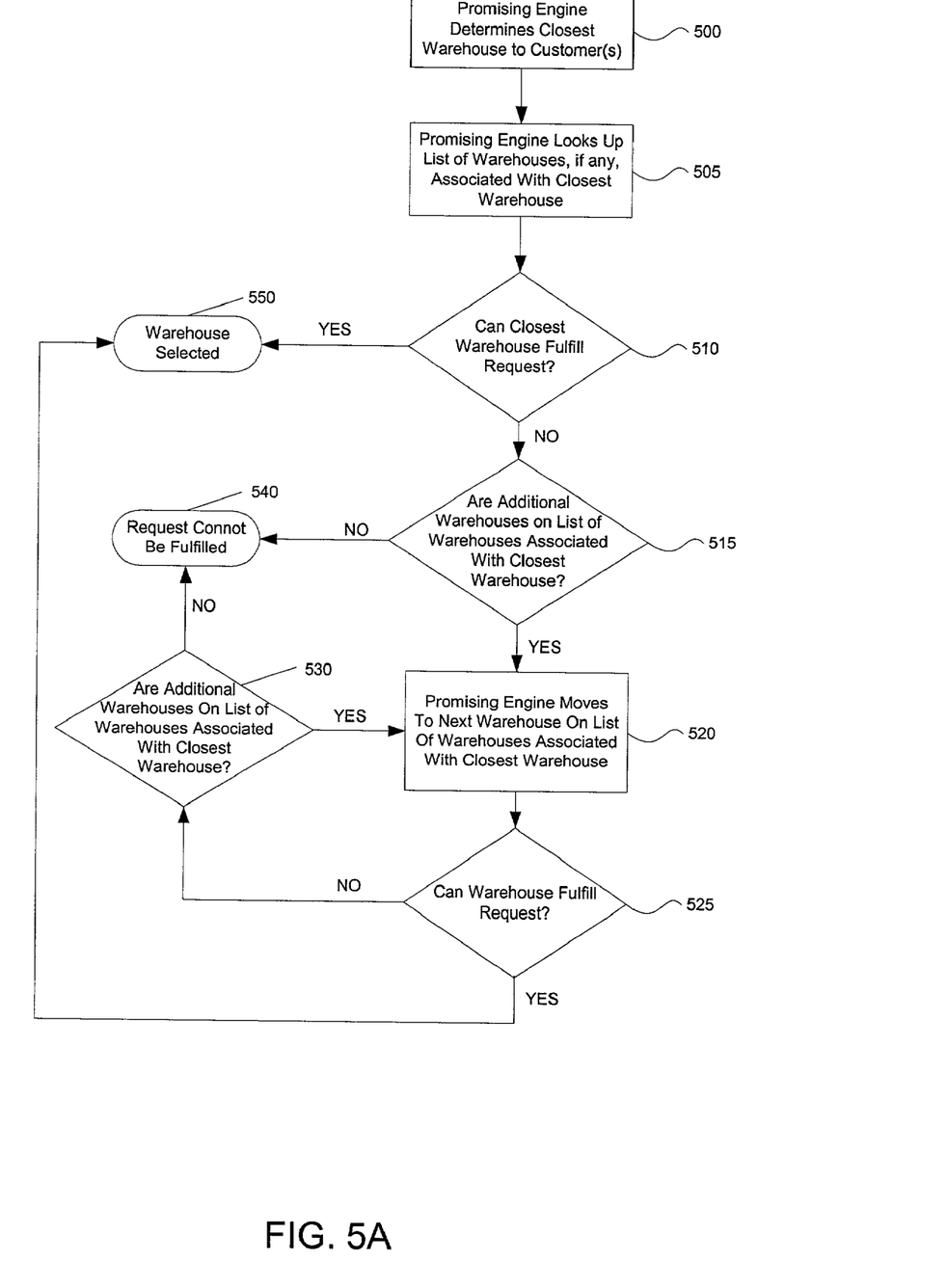
FIG. 5A is a flow chart illustrating the rules by which the promising engine determines which warehouse in the distribution system will seek to fulfill a request, according to a preferred embodiment of the present invention.

Next, FIG. 5A illustrates the basic rules by which the promising engine determines which warehouse in the distribution system will seek to fulfill a request, according to a preferred embodiment of the present invention. After receiving a request from a client the promising engine 130 first examines the request to determine the closest warehouse to the customer (block 500). To determine the closest warehouse, the promising engine 130, and more specifically, the promising control module 220, queries delivery network data maintained in the promising engine to determine the warehouse that is geographically closest to the customer geographical location data in the request. The delivery network data thus comprises location information for each warehouse, which may be stored within the storage device 280 of the promising engine or within the promising engine control module 220. The warehouse closest to the customer geographical location is designated by the promising engine 130 as the primary warehouse from which the request should be sourced because it is the closest warehouse to the customer location and therefore assumed to result in the least cost in shipping the item to customer. Once the primary warehouse is determined the promising engine 130 refers to (or looks up) a pre-defined ordered list of secondary warehouses associated with that primary warehouse (block 505). The secondary warehouses are prioritized and sequenced the same way after the primary warehouse, regardless of ship-to geographical location on the request. The secondary warehouses will be prioritized on the distance from the primary, which means that the secondary warehouses may not always be the closest to each ship-to location, depending on where they are relative to the primary warehouse.

After the list of warehouses is determined, the promising engine control module 220 determines whether the closest (primary) warehouse can fulfill the request (block 510). To make this determination the promising engine 130 communicates with the APS application 160, which maintains up-to-date inventory of each warehouse in the system. More specifically, the promising engine will query the APS application, seeking to find out if the primary warehouse can meet the criteria identified by the request, such as whether the warehouse contains the item or items requested, can meet customer or client identified shipping terms, and can fulfill any additional requirements of the request. The APS responds with data corresponding to the promising engine's query, and the promising engine determines whether the primary warehouse is able to fulfill the request. If so, the primary warehouse is selected to fulfill the request (block 550).

If the primary warehouse is unable to fulfill the request, the promising engine 130 determines whether there are additional warehouses associated with the primary warehouse (block 515). Typically, all warehouses in the system will be associated with other warehouses on respective lists in which each warehouse is the primary warehouse. The warehouses are ranked in order from closest to furthest from the primary warehouse. Optionally, the promising engine 130 may only look up the list of warehouses associated with the primary warehouse after determining whether the closest warehouse can fulfill the request, such that block 505 is located between blocks 510 and 515 in the flowchart of FIG. 5A. If the request cannot be fulfilled by any of the warehouses, the promising engine indicates so by a communication to the customer and/or client (block 540). However, the promising engine 130 may first attempt to split the order fulfillment between 2 or more warehouses, if necessary, to fulfill a request that cannot be met by any warehouse. This is described in further detail below. Otherwise, the promising engine 130 repeats the steps discussed above and determines whether the next closest warehouse can fulfill the request (blocks 520, 525, 530). This process continues in a serial fashion until a warehouse is selected (block 550) or no warehouses can fulfill the request (block 540). It should be appreciated that although the flowchart of FIG. 5A represents that the promising engine serially determines whether each warehouse can fulfill the request, thus reducing the processing required to determine the appropriate warehouse for fulfilling a request, the promising engine may request such information from all the warehouses at the same time. In such a scenario only one request may be submitted to the APS application. However, the promising engine would process the APS application response in the same fashion as discussed above.

Figure 5B:
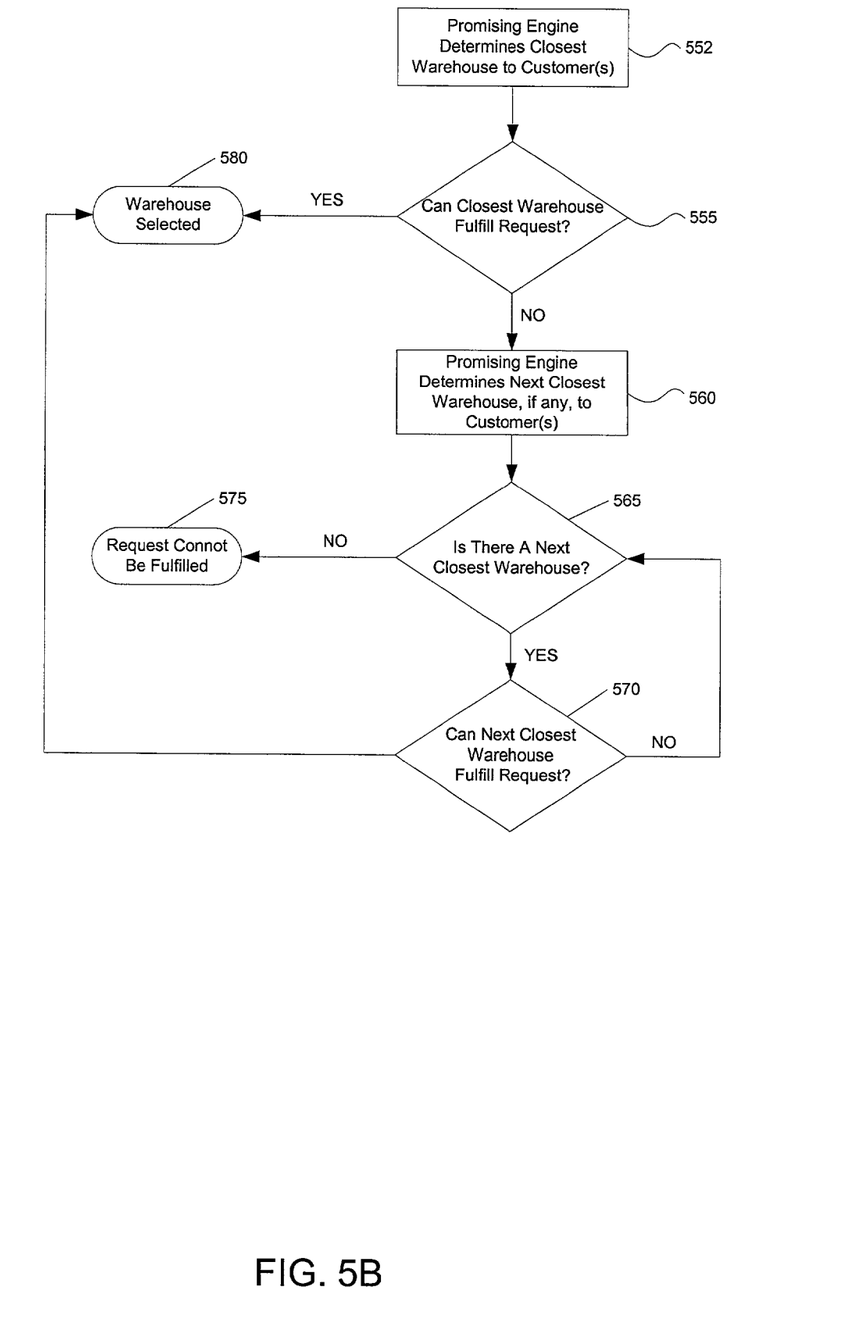
FIG. 5B is a flow chart illustrating an alternative set of rules that may be used by the promising engine to determine which warehouse in the distribution system will seek to fulfill a request, according to another embodiment of the present invention.

FIG. 5B illustrates an alternative set of rules that may be used by the promising engine to determine which warehouse in the distribution system will seek to fulfill a request, according to another embodiment of the present invention. This embodiment differs from the embodiment of FIG. 5A in that the promising engine always attempts to utilize the closest warehouse to the consumer to fulfill each request. After determining the closest (primary) warehouse to the customer (block 552), as in block 500 of FIG. 5A, the promising engine determines whether the primary warehouse can fulfill the request (block 555), as in block 510 of FIG. 5A. If so, the warehouse is selected (block 580). Otherwise, the promising engine determines the next closest warehouse to the customer that can fulfill the request. This is unlike the process illustrated in FIG. 5A because the promising engine determines the next closest warehouse rather than referring to delivery network data that maintains lists of warehouses' distance from each other warehouse. So long as there is an additional warehouse that may be queried, this process continues (block 560, 565, 570) until the request cannot be fulfilled (block 575) or a warehouse is selected (block 580).

Figure 5C:
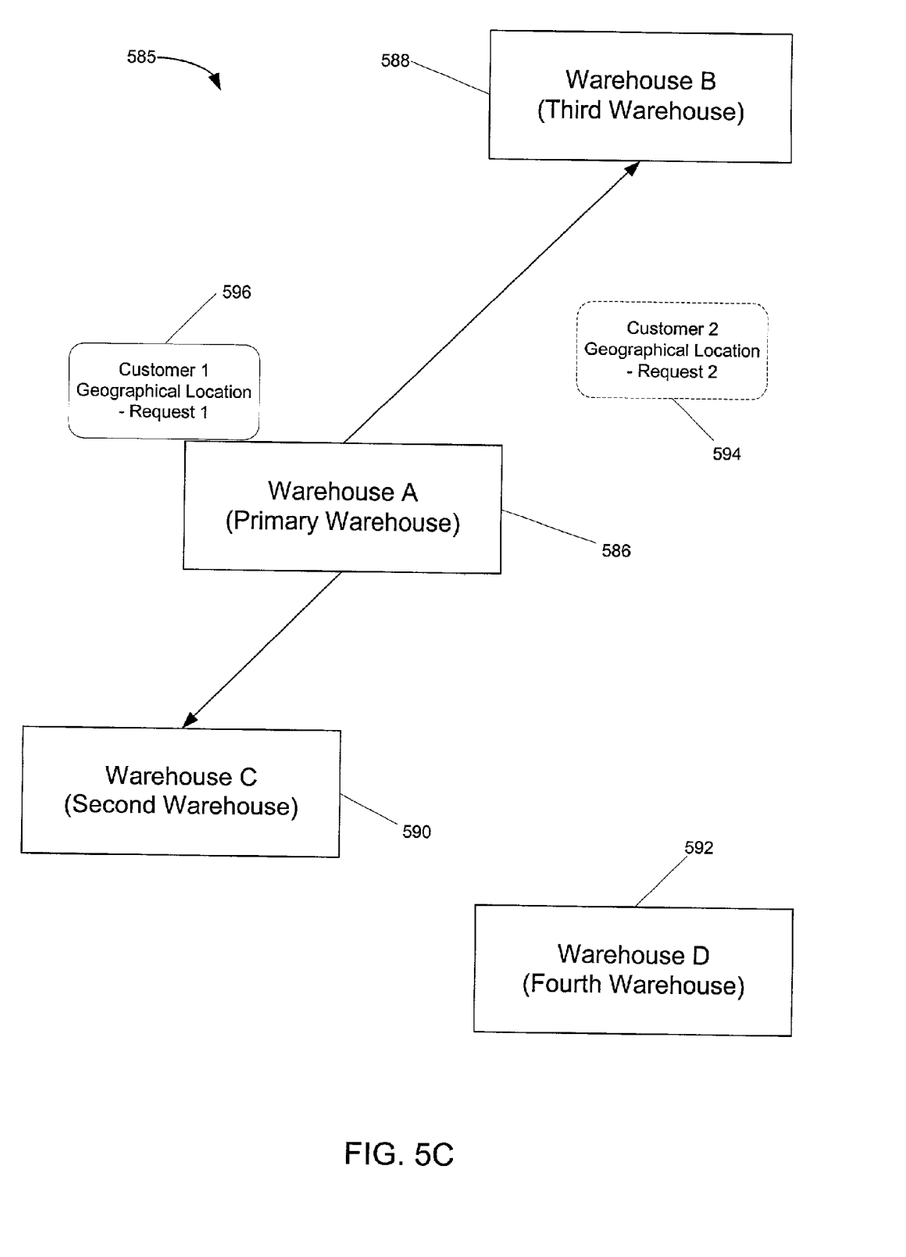
FIG. 5C shows the location of four warehouses in relation to the location of two customers requesting items from the system of the present invention, according to one illustrative example.

FIG. 5C is a block diagram showing the location of four warehouses in relation to the location of two customers requesting items from the distribution system 500. The diagram includes a primary warehouse ('A') 586, a second warehouse ('B') 590, a third warehouse ('B') 588, and a fourth warehouse ('D') 592. A 586 resides closer to C 590 than to B 588 in the block diagram to represent that it is closer geographically to C than to B. Also illustrated is a first customer 596 at a first geographical location, and a second customer 594 at a second geographical location. FIG. 5C is next used to illustrate the alternative processes of FIGS. 5A and 5B, above.

Using the process of FIG. 5A, requests from the first customer 596 and second customer 594, are submitted to the promising engine from a client associated with two customers 596, 594. The requests result in a determination by the processing engine that A 586 should be used to fulfill both requests, if possible, as it is closest in geographical location to both the first customer 596 and second customer 594. Referring to hypothetical table 1, below, if A 586 is found as the primary warehouse, then the order of the secondaries will be C 590 then B 588 then D 592, regardless of the first customer location. This is based upon the fact that C 590 is closer to A 586 than is B 588 or D 592, and D 592 is the furthest from A 586. Therefore, although warehouse C 590 may be the next closest warehouse for the first request, it is not for the second request, as the second request is in actuality closer to B 588 than to C 590. Thus, if A 586 is unable to fulfill the requests, and C 590 and B 588 are both capable of fulfilling the requests, the promising engine, and more specifically, promising engine control module, will instruct C 590 to fulfill both the requests because it is the second warehouse according to the delivery network data illustrated in Table 1. In this example, there are four separate sourcing rules, one for each warehouse that is defined in the system. There will always be as many sourcing rules as there are warehouses in the system.

TABLE 1

| Primary Warehouse | A | B | C | D |
| --- | --- | --- | --- | --- |
| Second Warehouse | C | A | A | A |
| Third Warehouse | B | D | D | B |
| Fourth Warehouse | D | C | B | C |

Thus, using the process of FIG. 5A, the promising engine will first seek to fulfill the request from the closest available warehouse, then will use predefined geographic relationships to determine the order in which the warehouses will be asked to fulfill a request. This process minimizes the processing required by the processing engine, and is thus preferred over the process of FIG. 5B.

The alternative process of FIG. 5B will lead to a different result. Because the process in FIG. 5B always seeks out the closest warehouse to the customer, if A 586 is unable to fulfill both requests (one from the first customer and one from the second customer), the first customer's request will be fulfilled by C 590 and the second customer's request will be fulfilled by B 588 (rather than by C in the previous example) so long as B 588 and C 590 can fulfill the requests. Thus, the promising engine operates under the assumption that the closest available warehouse to the customer will have the lowest shipping cost, and that the next closest warehouse should always be selected regardless of the processing required to lead to the result.

A. Requests Types

Thus far requests to the promising engine 130 have been described as requests for promises and requests for orders. More specifically, there are four types of requests that may be made by the clients for promises or orders: unbounded, bounded by date, bounded by service, and rush (which is a special case of bounded by service). These orders are identified by item data corresponding to one or more requested items, shipping terms, or in additional data required to process the request. The promising rules discussed above are executed by the promising engine control module 220 for all four request types. However, there are also unique promising flow rules for each individual request type. These rules are also maintained by the promising engine control module 220.

Generally, unbounded, bounded by date and bounded by service are standard type orders or requests. These requests or orders use a warehouse's general capacity and follow standard flow procedures described in detail herein. Unless an order or request comes into the promising engine 130 with the specialty rush service specified, the order or request is considered to be (defaults to) a standard type order. If an order or request is standard type, it will never be promised as a specialty rush order unless it is sent to the promising engine 130 as a specialty rush order. In other words, the promising engine 130 does not switch from a standard request flow to a specialty request flow, as described in greater detail with respect to rush orders.

To identify the request as a general request, a single general capacity item will be created and enabled in all warehouses for the standard type orders. The promising engine 130 will attach a single general capacity item to each line item on the standard type order prior to the first query to the APS application. This general capacity item will have a unique supply picture in each warehouse, and will be used for all standard type orders. The promising engine 130 will know that the general capacity item should be attached because, unless it is explicitly indicated on the order that it is a rush (premium service) order, then it will default to be a standard type order. No other parameter needs to be included with this type of order to indicate it is a standard type order.

A rush order, on the other hand, is a specialty order and a specialized type of bounded by service order or request. Rush orders have a unique warehouse cutoff time and unique capacity supply (described in further detail later). A rush specialty order or request is defined by the client and/or customer shipping terms, and is as one that comes into the promising engine 130 requesting that the item be shipped from the warehouse using a carrier's overnight service and a warehouse's premium handling service. All other orders and requests default to standard type orders (i.e. if a request is entered with only overnight service, it is a standard type order). The rules of the promising engine control module 220 assume that a customer would choose to submit a request as a standard type overnight service request before attempting to get it rush, as theoretically this would provide the same service level at a much lower cost. If the request could not be met as a standard order type, and the customer were willing to pay a premium, after receiving a response from the promising engine 130 that the request could not be met, the customer could re-submit the request as a specialty rush order. According to one aspect of the invention, specifying a rush order or request does not guarantee next day delivery. If there is not sufficient capacity or inventory, then the request simply cannot be met, even if it is a rush order.

To identify the request as a rush, a single rush capacity item will be created and enabled in all warehouses for the rush specialty type orders. The promising engine 130, and more specifically, promising engine control module 220, attaches a rush capacity item (or identifier) to each line item on the rush order prior to the first search at the APS application to determine which warehouse is available to promise, or fulfill, the request. The promising engine 130 will know to attach the rush capacity item because the order will come in from the client with the overnight service and premium handling service specified, which is what defines an order as a specialty rush order. If only the overnight service was specified, it would default to standard type service and the general capacity item would be used.

B. Promising and Promising Horizons

It should be appreciated that the promising engine 130 only promises inventory that physically is present within a warehouse and ready to be shipped (four wall promising). Thus, promises returned to clients will be based off inventory and capacity availability, where inventory availability includes inventory on-hand in the warehouse. However, the promising engine 130 can also promise inventory against a standard lead time established by a client 120, when a client 120 desires such lead promising. Where a lead time is established by the client, infinite supply quantity is assumed because the promising engine 130 does not have visibility into the supply channel. The promising engine 130 may also extend further into the supply chain and allow for promises to be made on items that are still in transit to the warehouse or other staging area—reliance may be place on such indicia of availability as advanced shipping notices. Therefore, according to one aspect of the invention, the promising engine 130 can consider advanced shipping notices (ASNs) and purchase orders (POs) as eligible inventory. POs for order promising refer to purchase orders for supply that is to be delivered to the warehouse. These POs are owned and processed by the client. Furthermore, the promising engine 130 may also employ a repromising feature, in which shipments are stored and verified such that changed availability conditions (e.g., items that have been promised are later destroyed or are missing) result in repromising of the requests.

The promising engine 130 does not prioritize or optimize the fulfillment of orders, with the exception of rush orders, as noted above and explained in greater detail below. Therefore, standard type requests are generally processed on a first in-first out (FIFO) basis. Thus, the promising engine 130 attempts to reserve orders based on the order in which they are received regardless of the customer's identity and regardless of other orders that may be placed by the same customer. For instance, where a first customer places an order for 10 widgets just prior to a second customer placing an order for 1 million widgets, the promising engine 130 will fulfill the 10 widget order first, even when there are exactly 1 million widgets in inventory. Therefore, the second customer's order will not preempt the first customer's order because it is larger in size (or from a preferred customer). After fulfilling the first order the promising engine 130 will not promise the second order. However, if multiple shipments are allowed by the client, then the promising engine 130 can either ship the remaining widgets to the second customer, if the second customer so desires. Of course, as noted previously, the promising engine 130 can promise the second order for all of the widgets if the client has submitted a lead time for the widgets that would make delivery of the order possible.

C. Promising Engine Rules For Determining Whether a Warehouse Can Fulfill a Request The promising engine 130, and more specifically, the promising engine module 240, comprises a number of rules that are used by the promising engine 130 in determining whether a warehouse can fulfill a client request, based upon data forwarded to the promising engine 130 from the APS application 160, and more specifically, the GATP function of the APS application 160. As noted above, the GATP function maintains a picture of the items in each warehouse, and whether the items may be shipped from each warehouse by a particular date. As referred to herein, a GATP search is a query by the promising engine 130 to the APS application 160 such that the promising engine 130 requests inventory and warehouse capacity to determine whether a warehouse can fulfill a client request.

A number of assumptions are made by the promising engine control module 240 in querying the APS application 160 to perform a GATP search in an attempt to fulfill a request. First, the promising engine 130 assumes that the maintenance of a single shipment has higher priority than sourcing from the primary warehouse. In other words, the promising engine 130 will look to satisfy the entire order in the primary warehouse. If the entire order cannot be satisfied from this warehouse, it will look to satisfy the entire order in all secondary warehouses. It will not look to split the order, even if it finds partial availability in the primary warehouse, until it has exhausted the search in full at all other warehouses. Secondly, for rush orders, attaining an overnight delivery has higher priority than maintaining a single shipment. In other words, it is more desirable to split shipments across warehouses to deliver the order overnight than to maintain a single shipment and ship it later.

Third, for bounded by date orders, maintaining an on-time delivery has higher priority than maintaining a single shipment. In other words, it is more desirable to split shipments across warehouses to delivery the order by the requested delivery date than to maintain a single shipment and ship it late. Fourth, for bounded by date orders, maintaining the cheapest delivery service level for single shipment orders has higher priority than sourcing from the primary warehouse. This, however, does not apply to requests bounded by service and rush, where the service level is already defined.) In other words, the promising engine 130 will try to satisfy the request in full using the cheapest delivery service from the primary warehouse. If the request cannot be promised from the primary warehouse, the promising engine 130 will look to all secondary warehouses using the cheapest delivery service. If the request cannot be met in full from any warehouse using the cheapest delivery service, then the primary warehouse becomes the higher priority. Regardless of the delivery service required, the promising engine 130 will satisfy the order in full from the primary warehouse before moving on to the secondary warehouses. At this point, after the cheapest service search is exhausted, any service in the primary warehouse is preferred over any service in any secondary warehouse.

Fifth, the ATP search for all request types looks for both the inventory items and capacity items that are associated with that request. If any items, whether they be inventory or capacity items, are tied together in a shipment request, then the ATP search must satisfy them together, on the same date and in the same warehouse. However, request can nevertheless be split across dates or across warehouses. If the request (either single line item or multiple line items) needs to be split, the ratio of the ship sets needs to be maintained when it is split. Additionally, the promising engine 130 must be able to recognize multiple shipments across warehouses and across dates within the same warehouse. A maximum number of partials may be needed to limit the number of shipments out of a single warehouse.

Sixth, the promising engine 130 operates under the rule that inventory is cumulative (it can roll over from one day to the next if it is not utilized) and capacity is not. Under this assumption, inventory may be found in multiple quantities on multiple dates and may be used to satisfy a single or multiple shipments on, or even after, the latest date that the inventory is found. When this happens, it must be ensured that the entire capacity requirement is available on that latest date, which becomes the ship date. An example of how the "ship date" is found: if inventory is available from primary warehouse on Date(n) and capacity is available in primary warehouse on Date(n+1), the ship date would be Date(n+1).

D. Performing the Available To Promise Evaluation

When a shipment set (i.e., group of items to be shipped) is sent to the GATP application (or server) of the APS application 160, an ATP check will first look to satisfy all items on the requested ship date in the primary warehouse, which is determined prior to calling GATP. If the entire shipment set can be satisfied on the requested ship date in the primary warehouse, then the quantity and date are returned as the response. There would be no reason to continue searching if the request was met in full on the requested date and primary warehouse because this is the optimal response. If the entire quantity cannot be found in the primary warehouse on some date in supply horizon, then GATP looks at each secondary warehouse defined in the sourcing rule. If the entire quantity cannot be found after looking into each warehouse, the entire quantity is available as infinite supply on a standard lead time date from the primary warehouse.

For instance, if 50% of the order can be satisfied on the requested date in the primary warehouse, and 10% of the order can be satisfied on each consecutive day following the requested ship date for 5 days, GATP will return 100% on the fifth (last) day. As another example, if 0% of the request can be satisfied on the requested date, but 100% can be satisfied within the standard lead-time on various dates, then the response will consist of a single date and quantity combination containing the last date that supply was found to complete the request, or the date on which the desire quantity ordered has accumulated and is, thus, available. The date and partial quantity combinations found to satisfy the request can be captured from the supply/demand picture of ATP.

If the entire shipment set cannot be satisfied in the primary warehouse, regardless of the date and partial quantity combinations found for it, then the response will consist of a single date and quantity in the infinite lead-time supply bucket, if the entire quantity could not be satisfied in a secondary warehouse. Even though it could have satisfied part of the order on time or within the standard lead-time, it pushes to the infinite supply bucket. However, if the client allows split shipments, the promising engine 130 will attempt to split the ship set across warehouse's and dates to meet the net demand. The date and partial quantity combinations from within the lead-time bucket, if any were found, can be captured from the supply/demand picture of ATP.

The data that is not returned in the response, but can be captured in the supply/demand picture of ATP, may be used by the promising engine 130 to determine partial shipments, given that partials are allowed by that client. The specific logic and selection process of the promising engine 130 will be described in each of the individual request flows, as they will be unique to the request type. The promising engine 130 selects the partial quantities based on (2n+1) max number of shipments allowed, where n is the number of warehouse's defined in the sourcing rule used for this request. When the promising engine 130 uses the supply/demand picture to determine partial quantity availability, the promising engine 130 first attempts to satisfy a ship set, in full, from any warehouse defined in the sourcing rule. If the promising engine 130 cannot fulfill entire ship set in lead time and the client allows splits, the promising engine 130 splits the shipment by demanding a requested date/quantity from each warehouse, as needed, starting at the highest ranking warehouse, then demanding, from each warehouse, the cumulative available quantity on date in supply horizon when maximum quantity is accumulated, as needed, and finally, demanding any remaining quantities as an infinite shipment from the primary (highest ranking) warehouse.

If the entire request is found on the requested date and in the primary warehouse, then the ATP search will stop, as this is the optimal response. If the entire request is not found on the requested date in the primary warehouse, then the ATP search will continue through the primary warehouse and will also continue through each of the secondary warehouses. The secondary warehouses will be pre-defined and established inside of GATP using sourcing rules, which tell ATP the sequence in which to search the secondary warehouses. The search will be similar to that described above for the primary warehouse. If the entire quantity is met in the primary warehouse (or in any warehouse), the searching is terminated. The promising engine 130 does not calculate all possible responses, as this has significant performance implications. This promising engine 130 functionality will be described in further detail in the individual request flows below.

E. Promising Flows for Each Request Type

This section describes each of the four request types (Unbounded, Bounded by Date, Bounded by Service, and Rush, which is a special case of Bounded by Service). The promising engine knows the type of request it is processing, as described in detail above, and, based on which request type it is, the promising engine 130 will determine the requested ship date that will be passed to the GATP application.

1. Unbounded Requests

If the request type is unbounded, then the request is being made without a specified date or service level. The promising engine will set the requested ship date to the current date, abiding by a 3 PM (or some other pre-determined) cutoff time for accepting orders. Time is preferably padded in for the system to obtain, promise, create and process the order before the last shipment goes out. There will be a unique cutoff time per warehouse, time zone appropriate. Thus, there may be a different cutoff time in each warehouse.

2. Bounded by Service Request

If the request type is bounded by service level, then the request was placed with a desired delivery service (i.e. overnight delivery, ground service). If this is the case, then the promising engine will set the request ship date to the current date, abiding by a 3 PM (or some other pre-determined) cutoff time for accepting orders. There needs to be time padded in for the system to obtain, promise, create and process the order before the last shipment goes out. There will be a unique cutoff time per warehouse, time zone appropriate. Thus, there may be a different cutoff time in each warehouse.

An assumption for bounded by service requests is that the client sends the service level as it is appropriate to the shipment and the system assumes that it is correct. For example, if the items are Hazardous Material that cannot be shipped via air service, then the system relies on the client to send the system a shipment method that is valid. No weight and cube verification will occur for bounded by service requests.

3. Bounded by Date Request

If the request type is bounded by date, then when the request comes into the promising engine, the promising engine should know if the client uses a carrier associated with the promising engine and system of the present invention, such as United Parcel Service, Inc (UPS). If the client uses a carrier associated with the system, such as UPS, the carrier may receive a delivery date request. For example, if the cheapest service available is a ground service that takes 5 days to deliver, but the requested delivery date is only 3 days from the receipt of the request, utilizing the cheapest service is not an option. Therefore when the promising engine 130 calls the delivery network to choose a service to start searching with, it takes this into account. The requested ship date used is the current date. On the other hand, if a carrier not associated with the system is used, the delivery date requirement is not given to the carrier and the promising engine 130 must request a ship date from the client.

4. Rush Requests

If the request type is a rush order, then the client/customer will be paying a premium for that order to arrive next day. The client will submit to the system that next day (overnight) service and premium handling service are requested. The premium handling service is what distinguishes a rush order from all other standard type orders. Rush capacity is required for all rush orders. It is anticipated that the rush capacity will represent the period of time beyond the normal standard warehouse cutoff, up to the rush cutoff for that warehouse. In other words, if the normal working hours of the warehouse is from 7 AM to 3 PM, then the standard general capacity for that warehouse would be 8 hours per day (or x units of standard type orders processed per day). If the rush cutoff time were 7 PM, then the rush capacity would represent the hours, or capacity, between 3 PM and 7 PM—either 4 hours per day or X units of rush orders per day. It is anticipated that rush requests always hit the rush capacity. The capacity profiles will be closely monitored so that capacity may be transferred manually between the general capacity and the rush capacity as necessary.

According to one aspect of the invention, there is an upper limit placed on how many rush orders can be accepted on any given day (rush capacity). If over this maximum limit the request is rejected. There will be a cutoff time unique to rush orders, in that the system will accept rush orders beyond the standard cutoff time for that warehouse. Rush orders will be promised against on-hand inventory only, not ASNs or POs. If inventory is not available on-hand, then a no or null promise is returned. Since this is not standard functionality in GATP, this distinction will need to take place in the promising engine.

F. Order Management Function of the Promising Engine

Order Management process includes order creation, order change, order cancel and back order processing. The sales orders, interactive and non-interactive, will be received from clients and passed to the promising engine. The promising engine 130 validates the sales orders against the promises and passes them to Order Management System (OMS) for further processing, and the OMS, in turn, sends the orders to the warehouse management system 190 for fulfillment. The OMS may be an off-the-shelf conventional component not illustrated in the system 100 of FIG. 1, or included in the system 100 as part of another system component. Using the OMS most of the processes that handle sales orders coming into the system from clients will be automated.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A supply chain management system comprising:
   at least one client computer that is associated with a user, the user being associated with a user geographical location;
   a plurality of warehouses; and
   a promising engine that is adapted for:
      receiving an order from the client computer for at least one item, the order including (1) item data identifying the at least one item and (2) a request for a value-added service;
      in response to receiving the order from the client computer for the at least one item, identifying a particular warehouse of the plurality of warehouses as the closest of the plurality of warehouses to the user geographical location that has an ability to ship the at least one item to the user geographical location within a specified timeframe and provide said value-added service; and
      in response to identifying the particular warehouse as the closest of the plurality of warehouses to the user geographical location that has an ability to ship the at least one item to the user geographical location within the specified timeframe and provide said value-added service, designating the particular warehouse as a shipping warehouse from which the at least one item will be shipped to the user geographical location.

2. The system of claim 1, wherein the specified timeframe is established by the user.

3. The system of claim 1, wherein the client computer is in communication with the promising engine via a wide area network.

4. The system of claim 1 wherein said value-added service includes gift-wrapping.

5. A supply chain management system comprising: a promising engine that is configured for:
   receiving at least one order from a client computer for at least one item, wherein the at least one order includes (1) item data corresponding to the at least one item, (2) location data corresponding to a user geographical location, and (3) a request for a value-added service;
   in response to receiving the at least one order from the client computer, using the item data, the location data, and said request to provide said value-added service to identify a particular one of a plurality of warehouses as the closest of the plurality of warehouses to the user geographical location that has an ability to ship the at least one item to the user geographical location within a specified timeframe and provide said value-added service;
   in response to identifying the particular warehouse as the closest of the plurality of warehouses to the user geographical location that has an ability to ship the at least one item to the user geographical location within the specified timeframe and provide said value-added service, designating the particular warehouse as a shipping warehouse from which the at least one item will be shipped to the user geographical location; and
   transmitting a request to a computer associated with the shipping warehouse, the request instructing the shipping warehouse to provide said value-added service and to ship the at least one item to the user geographical location.

6. The system of claim 5, wherein the location data comprises a zip code.

7. The system of claim 5, wherein the promising engine is further configured for receiving the at least one order from the client computer via the Internet.

8. The system of claim 5, wherein the item data comprises user shipment terms.

9. The system of claim 8, wherein the user shipment terms include a delivery date.

* * * * *